US012688591B2

(12) United States Patent
Alves et al.

(10) Patent No.: US 12,688,591 B2
(45) Date of Patent: Jul. 21, 2026

(54) COMPUTER VISION-ASSISTED ANALYSIS OF MOTION OF A PERSON

(71) Applicant: Sword Health, S.A., Oporto (PT)

(72) Inventors: José Carlos Coelho Alves, Oporto (PT); Pedro Henrique Oliveira Santos, Oporto (PT); Ricardo Miguel Pontes Leonardo, Oporto (PT); Yosbî Antonio Alves Saenz, Oporto (PT); João Paulo Dias Andrade, Oporto (PT); Márcio Filipe Moutinho Colunas, Oporto (PT); Virgílio António Ferro Bento, Oporto (PT)

(73) Assignee: SWORD HEALTH, S.A., Oporto (PT)

( * ) Notice: Subject to any disclaimer, the term of this patent is extended or adjusted under 35 U.S.C. 154(b) by 293 days.

(21) Appl. No.: 18/525,561

(22) Filed: Nov. 30, 2023

(65) Prior Publication Data

US 2024/0185436 A1 Jun. 6, 2024

(30) Foreign Application Priority Data

Dec. 2, 2022 (EP) .................................... 22398027

(51) Int. Cl.
*G06T 7/246* (2017.01)
*G06T 7/55* (2017.01)
(52) U.S. Cl.
CPC ................ *G06T 7/248* (2017.01); *G06T 7/55* (2017.01); *G06T 2207/10028* (2013.01); *G06T 2207/30196* (2013.01)
(58) Field of Classification Search
CPC . G06T 7/248; G06T 7/55; G06T 2207/10016; G06T 2207/10028; G06T 2207/30196; G06T 2207/30221
See application file for complete search history.

(56) References Cited

U.S. PATENT DOCUMENTS

2015/0310629 A1* 10/2015 Utsunomiya .......... G06V 10/34
382/107
2015/0324637 A1* 11/2015 Utsunomiya .......... G16H 20/70
382/107

(Continued)

FOREIGN PATENT DOCUMENTS

EP       4383194       6/2024
WO    2019243438    12/2019

OTHER PUBLICATIONS

"European Application Serial No. 23213832.1, Extended European Search Report mailed May 14, 2024", 6 pages.

(Continued)

*Primary Examiner* — Kenny A Cese
(74) *Attorney, Agent, or Firm* — SCHWEGMAN LUNDBERG & WOESSNER, P.A.

(57) ABSTRACT

Examples described herein relate to computer vision-assisted analysis of motion of a person. An optical device of a motion tracking system captures a calibration image of the person. The calibration image is processed to determine at least two calibration length values based on distances between anatomical landmarks associated with at least one body member. The optical device captures an exercising image of the person while the person performs a predetermined exercise. The exercising image is processed to determine at least two target length values based on distances between the anatomical landmarks associated with the at least one body member. A depth-related parameter associated with a target body member of the person is determined based on the calibration length values and the target length values. The depth-related parameter is used in the motion tracking system to track motion of the person with respect to the predetermined exercise.

20 Claims, 5 Drawing Sheets

(56) References Cited

U.S. PATENT DOCUMENTS

| | | | | |
|---|---|---|---|---|
| 2019/0362139 | A1* | 11/2019 | Mehl | G06V 40/23 |
| 2021/0263598 | A1 | 8/2021 | Branquinho et al. | |
| 2021/0322856 | A1* | 10/2021 | Virkar | G06T 7/11 |
| 2022/0066544 | A1* | 3/2022 | Kwon | G06T 7/251 |
| 2022/0284652 | A1* | 9/2022 | Azhand | G06V 40/23 |
| 2023/0057733 | A1* | 2/2023 | Yoshioka | G06V 40/103 |
| 2023/0097454 | A1* | 3/2023 | Kim | G06T 7/77 |
| | | | | 382/103 |
| 2023/0285806 | A1* | 9/2023 | Webster | G06T 7/20 |
| 2023/0316811 | A1* | 10/2023 | Tavor | G06T 17/00 |
| 2023/0360248 | A1* | 11/2023 | Toth | G06V 20/52 |

OTHER PUBLICATIONS

Antonio, Jauregui David, "Real-time 3D motion capture by monocular vision and virtual rendering", Machine Vision and Applications, Springer Verlag, DE, vol. 28, No. 8, (Aug. 3, 2017), 20 pages.
Bullock, "Towards real-time 3-D monocular visual tracking of human limbs in unconstrained environments", Real-Time Imaging, Academic Press Limited, GB, vol. 11, No. 4, (Aug. 2005), 31 pages.

Gong, Wenjuan, "Human Pose Estimation from Monocular Images: A Comprehensive Survey", Sensors, vol. 16, No. 12, (Nov. 25, 2016), 39 pages.
"Pose Estimation", TensorFlow Lite, [Online]. Retrieved from the Internet: URL: https: www.tensorflow.org lite examples pose_ estimation overview, (Accessed Nov. 21, 2023), 5 pgs.
"Pose landmark detection guide—MediaPipe", Google for Developers, [Online]. Retrieved from the Internet: URL: https: developers. google.com mediapipe solutions vision pose_landmarker, (Accessed Nov. 21, 2023), 6 pgs.
Cochard, David, "BlazePose: A 3D Pose Estimation Model", axinc-ai, [Online]. Retrieved from the Internet: URL: https: medium.com axinc-ai blazepose-a-3d-pose-estimation-model-d8689d06b7c4, (Jun. 30, 2021), 11 pgs.
Ramakrishna, Varun, "Reconstructing 3D Human Pose from 2D Image Landmarks", Computer Vision—ECCV—Conference paper, [Online]. Retrieved from the Internet: URL: https: link.springer.com chapter 10.1007 978-3-642-33765-9_41, (2012), 1-14.
"European Application Serial No. 23213832.1, Response filed Dec. 11, 2024 to Extended European Search Report mailed May 14, 2024", 27 pages.

* cited by examiner

20

10

30

40

42    44

46

20

COMPUTER VISION-ASSISTED ANALYSIS OF MOTION OF A PERSON

CLAIM OF PRIORITY

This application claims the benefit of priority to European Patent Application No. 22398027.7, filed on Dec. 2, 2022, which is incorporated herein by reference in its entirety.

TECHNICAL FIELD

The present disclosure relates to the field of motion tracking. More particularly, but not exclusively, the disclosure relates to the estimation of motion of one or more parts of a person by processing images of the person.

BACKGROUND

Motion tracking, also known as motion capture, has gained attention in the last decade as new, more advanced motion tracking systems have been developed. Motion tracking has improved automation of many processes by, for example, associating a gesture made by a person with a given command to enable a controller detecting the gesture to automatically trigger an action.

Motion tracking has, however, enabled much more than that. One application that has benefitted from improvements in motion tracking systems is physical rehabilitation and wellbeing. More specifically, and thanks to accurate processing of motion of a person, the person can exercise at certain premises with automated digital supervision. Automated digital supervision allows the person to be informed as to whether their execution of exercises accords with one or more characteristics. This, in turn, can increase the availability of the person to perform, for example, rehabilitation exercises, because no human supervision is required. Human supervision was often necessary prior to automated digital supervision to ensure that persons are appropriately monitored and guided, and thereby to reduce the risk of injury.

BRIEF DESCRIPTION OF THE DRAWINGS

To complete the description and in order to provide for a better understanding of the disclosure, a set of drawings is provided. The drawings form an integral part of the description and illustrate examples of the disclosure, which should not be interpreted as restricting the scope of the disclosure, but just as examples of how the disclosure can be carried out. The drawings comprise the following figures.

DETAILED DESCRIPTION

Optical motion tracking is one among several motion tracking systems currently available. In some examples, an optical device, such as a digital camera, takes images of a person. By digitally processing the images by way of computer vision techniques, a computer attempts to determine how the body members of a person are oriented and move, and then validate the orientations and motion by comparing them with predetermined values.

Multiple computer vision techniques have been developed to, for example, detect the person on the images, and determine orientations and motion of limbs of the person, hence such digital processing can now be applied to images of optical devices. One of the limitations of these techniques though, which directly relates to the images themselves, may be that the body members can be more or less simply identified, and their motion assessed when they extend in a dimension that is at least somewhat parallel to the plane of the two dimensions of the image, namely the optical device plane, e.g., the height and the width of the images. When at least part of the body members extends in a direction perpendicular to the two dimensions of the image, namely perpendicular to the optical device plane, what could be called the depth dimension, the computer vision techniques may be more prone to errors in their detections and the computer determining what the body members are doing may become more erratic. This is so because the third dimension may be more difficult to analyze from planar images.

Figure 1A:
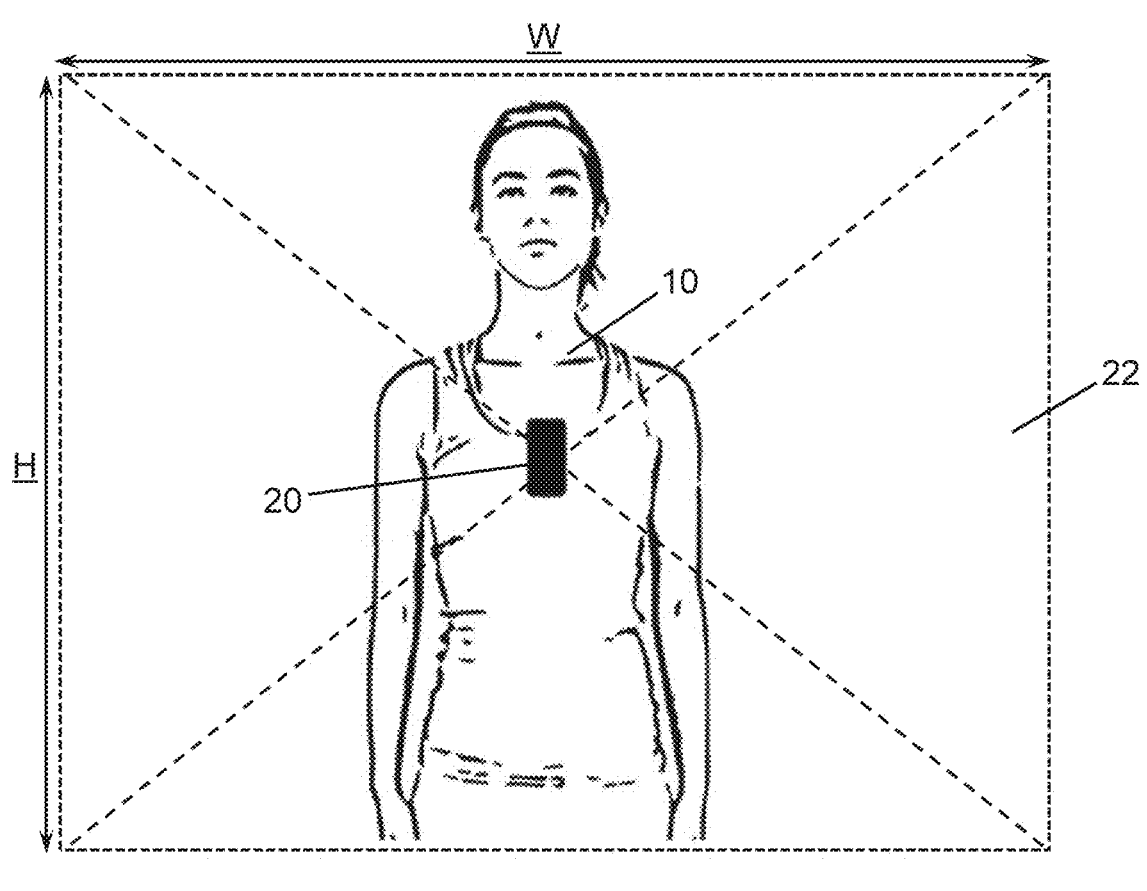
FIG. 1A shows, from the front, a person standing upright in front of an optical device, according to some examples.
Figure 1B:
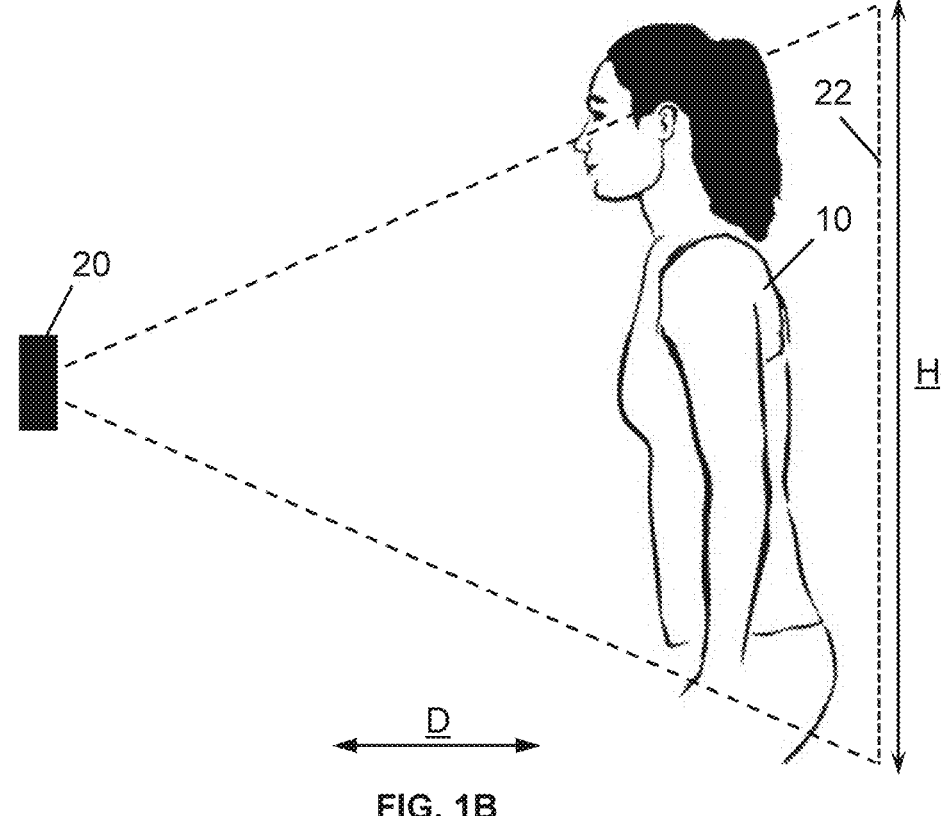
FIG. 1B shows, from the side, the person of FIG. 1A standing upright in front of the optical device, according to some examples.
Figure 2:
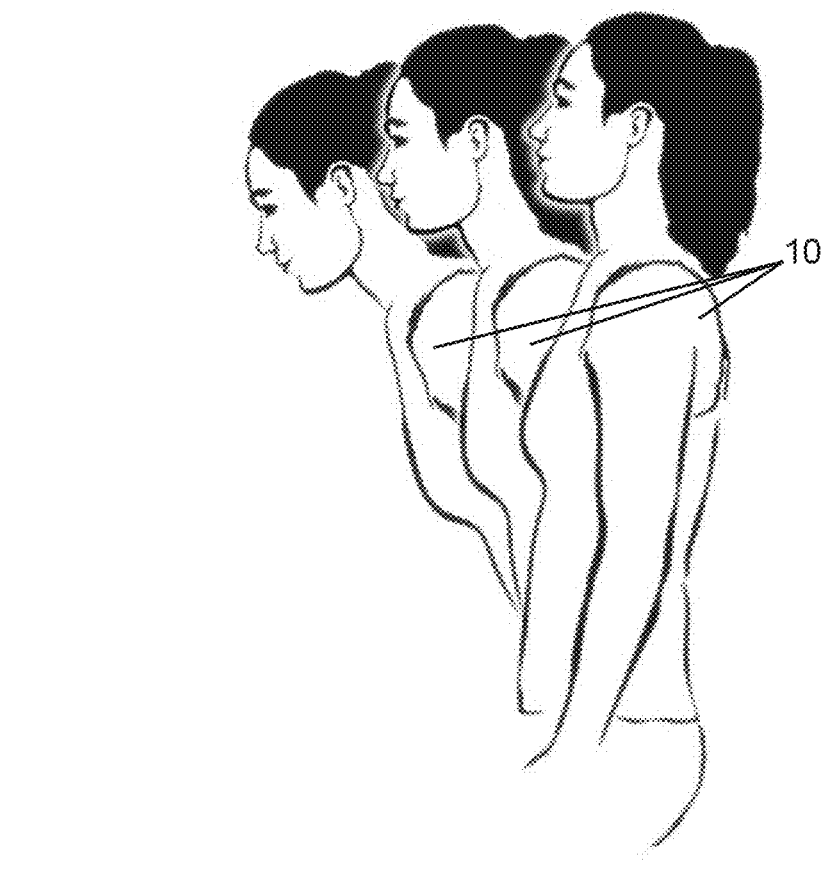
FIG. 2 shows the person of FIG. 1A and FIG. 1B with different leaning angles that might not be identified and/or quantified, or at least not accurately quantified, by a computing device upon processing images taken by the camera, according to some examples.

For example, FIG. 1A, FIG. 1B and FIG. 2 illustrate an example of the problematic identification of the possible leaning forward or back of a person while standing in front of an optical device as the movement is perpendicular to the optical device plane. Although illustrated with reference to the forward and backward movement of the chest relative to the hip, the same problem may occur with any other part of the body of a person when the person is oriented such that the part(s) of the body move in the depth direction of the optical device, that is to say, the part(s) get closer or farther from the optical device.

In some cases, shades of the colors are used to estimate the extension of something in the depth dimension, but that processing may be dependent on light conditions, among other factors. Stereo cameras can significantly improve detection in the depth dimension, but such cameras may not be widely available or may make a system more costly Depth sensors may have similar drawbacks.

Accordingly, it may be desirable to improve processing of images from an optical device to better establish how a body member is positioned or moves when at least partly extending along the depth dimension of the optical device.

A first aspect relates to a method. The method may include digitally processing at least one calibration image of a person taken with an optical device to compute at least one distance between predetermined anatomical landmarks of the person so that at least one calibration length value per body member of at least first and second predetermined body members of the person is computed. The at least one calibration image of the person may be captured while the person is in at least one predetermined calibration position.

The method may further include digitally processing at least one exercising image of the person taken with the optical device to compute at least one distance between predetermined anatomical landmarks of the person so that at least one target length value per body member of the at least first and second predetermined body members of the person is computed. The at least one exercising image of the person may be captured while the person is in at least one exercising position corresponding to at least one predetermined exercise to be performed by the person.

In some examples, in each of the at least one predetermined exercise the first predetermined body member is not to be moved and at least the second predetermined body member is to be moved, with each at least one target length value corresponding to a distance between the same predetermined anatomical landmarks used for computing the distance of each corresponding at least one calibration length value.

The method may include digitally computing a length variation factor, the length variation factor being based on both the at least one calibration length value of the first predetermined body member and the at least one target length value of the first predetermined body member. The method may further include digitally computing a scaled length value associated with the second predetermined body member, the second predetermined body member having at least one predetermined anatomical landmark thereof in a position relative to at least one other predetermined anatomical landmark when the at least one exercising image was taken that is different from the relative position when the at least one calibration image was taken, and the scaled length value being based on both the at least one calibration length value of the second predetermined body member and the length variation factor.

The method may include digitally computing at least one parameter of the second predetermined body member based on both the scaled length value and the at least one target length value of the second predetermined body member. The at least one parameter may comprise: a difference in depth of the at least one predetermined anatomical landmark relative to the at least one other predetermined anatomical landmark, and/or a range of motion in depth of the at least one predetermined anatomical landmark relative to the at least one other predetermined anatomical landmark.

The method, which may be conducted by one or more computing devices, may resolve or alleviate the limitation of computer vision techniques not capable of estimating or considering the depth dimension in images that predominantly capture targets in two dimensions.

In some examples, the method relies on at least one calibration image and features of the body of the person to determine whether a given body member as captured in the at least one exercising image may at least be partly extending in the depth dimension, considering as depth dimension that of the images taken not corresponding to the width and height dimensions of the image(s); hence, the depth dimension corresponds to the direction that is perpendicular to the optical device plane in the at least one calibration and/or exercising image.

The at least one calibration image may be processed so as to extract one or more calibration length values of at least the first predetermined body member to be used as a reference, and of the second predetermined body member that is the body member whose orientation and/or movement at least partly being in the depth dimension (according to the optical device plane corresponding to the at least one exercising image) are/is to be determined relative to another part of the body of the person. In each position of the at least one calibration position, the person may have at least the first and second predetermined body members with positioning adequate for capturing the two dimensions of the body members in the at least one calibration image, in some cases the two major dimensions. In some examples, the two dimensions of the body members are contained in a plane substantially parallel with an optical device plane, e.g., the plane of the images taken, or, in other words, the two dimensions of the body members are as aligned as possible with the two dimensions of the images taken.

The two dimensions of the body members may be contained in one of the main planes of the person, e.g., the sagittal plane, the coronal plane, the transversal plane. The two major dimensions refer to the two of the three dimensions of the body member where a length from end to end of the body member is greater than a length from end to end of the body member in the third dimension. By way of example, the two dimensions of the chest of a person are, in some cases, the width and height of the chest, the width being the dimension corresponding to, e.g., a segment from one shoulder to the other, or a segment from one hip to the other, and the height being the dimension corresponding to, e.g., a segment from a middle point between the hips and a middle point between the shoulders, or a segment from the coccyx to the neck. By way of another example, the two dimensions of the thigh of a person are, in some cases, the width and the length of the thigh, the width being the dimension corresponding to a segment from an internal side (the side closest to the other thigh when the person is standing still) to an external side (the side farthest from the other thigh when the person is standing still).

The calibration length values may be indicative of the length along one dimension (e.g., the width, the height, or the length) of each body member, or even two length values per body member, each length value being of a different dimension of the concerned body member.

The at least one exercising image taken during the exercising of the person may be processed to compute the target length values corresponding to the analogous calibration length values, meaning that distance measurements are made between the same pairs of predetermined anatomical landmarks considered for the calculation of the calibration length values but with the person being in a different position. In the at least one exercising image, the second predetermined body member may be oriented differently than during the calibration position, e.g., it may be extending more in the depth dimension of that image(s) than in the at least one calibration image. It is noted that the orientation of the body members can be established relative to other body members or anatomical landmarks of the person. For example, when a leg is risen up, it can be established that it is risen up owing to the angle formed between the leg (any part thereof, e.g., the thigh, the knee, or the shank) and the hip, or the closer distance between part of the leg and, e.g., the hip (e.g., the ankle or the foot is closer to the hip than when standing still in upright position), or the chest (e.g., the knee is closer to the chest than when standing still in upright position).

In some examples, the length variation factor is computed from the length values associated with the first body member, that is to say, the calibration and the target length values of the first body member. The length variation factor quantifies how much the length value of the first body member has varied from the calibration image(s) to the exercising image(s). In the calibration and exercising situations, the same calibration and target length values could be obtained for the first body member, but this generally does not occur because the first body member moved relative to the optical device and, for example, the distance between the first body member and the optical device changed, the angle between the first body member and the optical device changed, etc. The quantification of the length variation factor can be, for example but without limitation, in the form of a scaling factor.

In some examples, by means of the length variation factor and the calibration length value(s) of the second body member, the scaled length value corresponding to the second body member is computed. The scaled length value is at least partially representative of the component that the body member has in the depth dimension of the at least one exercising image. In this sense, differences existing between the calibration length value of the second body member and the scaled length value are due to the orientation of the body member that is at least partially along the depth dimension.

Accordingly, by processing the scaled length value and the at least one target length value of the second predetermined body member, the at least one parameter may be obtained.

In examples of the disclosure, identification of the predetermined anatomical landmarks and measurement of the distances therebetween may be made with any computer vision techniques known in the art and they all fall within the scope of the present disclosure. Such computer vision techniques are not described in this document in order not to obscure the invention, but, to name a few non-limiting exemplary digital libraries and algorithms, Google's TensorFlow Pose estimation, Google's MediaPipe Pose and BlazePose, and the algorithm described in "Reconstructing 3D Human Pose from 2D Image Landmarks" are some possible computer vision techniques to this end.

The predetermined anatomical landmarks to be identified and used for measuring the calibration and target length values may be associated with the predetermined exercise to be done by the person and, for example, are stored in a memory of the computing device(s) or retrieved by the computing device(s) from a server.

In some examples, digitally computing the at least one parameter comprises calculating a trigonometrical relationship between the scaled length value and the at least one target length value of the second predetermined body member.

The scaled length value and the target length value(s) may be related by way of trigonometrical relationships that provide a value for the at least one parameter, for example, an angle or a depth distance.

In some examples, in each of the at least one predetermined exercise to be performed by the person the first predetermined body member stays motionless, and the second predetermined body member is to be moved such that: at least one predetermined anatomical landmark thereof moves relative to the at least one other predetermined anatomical landmark and/or the second predetermined body member rotates relative to the at least one other predetermined anatomical landmark.

The at least one predetermined landmark moving may be any on the surface or volume of the predetermined body member, including a point contacting a joint that connects the second body member with a neighboring body member of the person, the neighboring body member generally not being the first predetermined body member (namely the reference body member) even though it could also be the first predetermined body member. The rotation of the second body member may be considered as the change in angular relationship between the second body member and a joint it is connected thereto or a neighboring body member.

In some examples, the at least one parameter comprises a depth direction, such as either a direction towards the optical device or a direction away from the optical device.

The movement in the depth direction may be considered based on the position of the at least one predetermined anatomical landmark relative to the at least one other predetermined anatomical landmark with the person in a predetermined position or posture, e.g., the at least one predetermined calibration position. Hence if, for example, the predetermined calibration position involves the person standing still in an upright position and the predetermined anatomical landmark is the end of the sternum, when the images of the person are taken from the front thereof (even though in other examples it could be from a side thereof, or from a back thereof), namely the person is facing the optical device, and the predetermined exercise requires the person to lean back, the depth direction is away from the optical device Conversely, if the exercise requires the person to lean forward, the depth direction is towards the optical device.

In some examples, the directionality in depth is, therefore, measured in a relative manner by assessing whether the moving landmark (namely the at least one predetermined anatomical landmark) is closer to or farther from the optical device than the reference landmark (namely the at least one other predetermined anatomical landmark) compared with their relative distance in depth during calibration Referring to the previous example, if during calibration the person was leaning forward forming, e.g., 30° relative to the vertical, and the reference landmark is, e.g., a hip joint, if the exercise requires the person to lean back but the person is still leaning forward forming, e.g., 10° relative to the vertical, the movement in the depth direction is away from the optical device.

In some examples, the depth direction is based on at least one biomechanical constraint of the second predetermined body member.

The computing device or computing devices conducting the method may have data indicative of what body member is the second predetermined body member and which biomechanical constraints it features. This may, for example, be the case when the method is part of a motion tracking procedure whereby the person performs physical rehabilitation or physical exercising with automated, digital supervision by the motion tracking itself, particularly the computing device(s) in charge of processing the tracked motion to determine what the person is doing and whether the movements and orientations of the body members thereof fulfill one or more constraints associated with the predetermined exercise.

Biomechanical constraints are mechanical limitations of body members that people typically have, owing to which the motion and rotation of body members is limited somehow. For example, the foot generally cannot be lifted towards the front part of the knee joint because the knee forbids such movement. In contrast, the knee allows some lifting of the foot towards sides relative to the knee, or towards the back of the knee (in which case, even angles greater than 90° formed between the thigh and the shin are generally possible).

Disambiguation of the depth direction may be possible by considering such biomechanical constraints. For instance, in the example about the foot and the knee mentioned above, the lifting of the shin towards the back of the knee can have the depth direction resolved as the direction away from the optical device (when the person is facing the optical device) because the other direction is not possible.

In some examples, the depth direction is based on the at least one predetermined exercise to be performed by the person.

The computing device or computing devices conducting the method may have data indicative of the at least one predetermined exercise to be performed by the person. This may, for example, be the case when the method is part of a motion tracking procedure whereby the person performs physical rehabilitation or physical exercising with automated, digital supervision as explained before.

With the predetermined exercise data, the depth direction may be made dependent upon what the person must actually do as part of the exercise and which part of the person is captured in the different images taken. Following with the previous example, if the predetermined exercise involves the person leaning back and the optical device is in front of the person, the sternum is to move away from the optical device, thus the depth direction is assigned in this way.

In some examples, the depth direction is based on the digital processing of the at least one calibration image and the at least one exercising image.

Computer vision techniques known in the art can be used for tracking the evolution in size of a certain target over time, or the evolution of either shadows or shades of colors of a certain target over time to distinguish between the target getting closer to the optical device or farther therefrom.

In this sense, if, for example, the exercise is moving the chest forward, the chest of the person has become larger from the calibration image(s) to the exercising image(s), and the length variation factor for the reference body member, e.g., the left thigh of the person, is one or close to one, the depth direction is towards the optical device. As the length variation factor differs more from one, additional processing of the size of a target or a set of targets might be necessary to determine whether growth in size is because the concerned body member is moving towards the optical device or not, because the person could have moved closer to the optical device (for whatever reason unrelated to the exercise) when the at least one exercising image was taken yet the concerned body member is moving away from the optical device.

Color processing of the images may rely on additional brightness or additional shadow in the concerned body member to determine if the depth direction is in one way or another.

In some examples, the at least one calibration length value per body member comprises at least two calibration length values for the first and/or second predetermined body members. In some examples, the at least one target length value per body member comprises at least two length values for the first and/or second predetermined body members.

In some examples, the method further comprises digitally computing a first reference ratio between the at least two calibration length values of the first predetermined body member and a second reference ratio between the at least two target length values of the first predetermined body member.

In some examples, the length variation factor is based on one of the at least two target length values when the second reference ratio differs from the first reference ratio by more than a predetermined ratio difference. The one of the at least two target length values may be the target length value of the first predetermined body member that has changed less, in proportion, relative to its respective calibration length value.

In some examples, the method further comprises, when the second reference ratio differs from the first reference ratio by more than a predetermined ratio difference, digitally commanding to provide or providing at least one user-perceptible signal indicative of a request to the person to change an orientation thereof relative to the optical device.

Differences between the first and second reference ratios corresponding to the reference body member may indicate that the person does not have the same orientation relative to the optical device in the calibration image(s) than in the exercising image(s). Depending on how much the reference ratios differ, or, for example, how much the result of one reference ratio divided by the other reference ratio deviates from the unit, e.g., 1, the change in orientation will be greater or lower. In some examples, the orientation relative to the optical device in the calibration and exercising images shall be as similar as possible.

Changes in the relative orientation, however, do not necessarily preclude the computation of the at least one parameter, although in some cases, especially when the differences between the reference ratios exceeds a predetermined threshold, it may be best to request the person to reposition themselves so as to improve the calculation of the at least one parameter once at least new exercising image(s) and, optionally, calibration image(s), are taken. When the person is not requested to reposition themselves, then the target length value considered for the computation of the length variation factor may be that having changed less with respect to its calibration counterpart, since that corresponds to the dimension having seen a lower impact by the change of orientation of the person.

In some examples, digitally computing the at least one parameter comprises calculating a first target ratio between the at least two calibration length values of the second predetermined body member and a second target ratio between the at least two target length values of the second predetermined body member.

Differences between the first and second target ratios corresponding to the moving body member may indicate that such body member has moved relative to the optical device in such a way that there has been a change in the extension of the body member along the depth direction. In some examples, the proportions in each target ratio should stay the same when there are no changes in the part, if any, of the body member that is in the depth direction of at least the exercising image(s).

Any change in the proportions due to the movement or reorientation of the person relative to the optical device, which are not due to the at least one exercise, may be compensated for with the scaled length value, so additional deviations between the first and second target ratios are due to the movement of the second predetermined body member. By processing the amount of difference between the target ratios, the at least one parameter is computable.

In some examples, the method further comprises: digitally commanding to take or taking the at least one calibration image of the person with the optical device; and/or digitally commanding to take or taking the at least one exercising image of the person with the optical device.

In some examples, in addition to computing the at least one parameter with one or more computing devices, the taking of the images to be used for computing the at least one parameter is commanded by the same computing device(s), thereby fully automating the entire process.

In some examples, the optical device is at a same location and has a same orientation when taking the at least one calibration image and when taking the at least one exercising image. In some other examples, the optical device is at a different location and/or has a different orientation when taking the at least one calibration image and when taking the at least one exercising image.

In some examples, the person is at a same location and has a same orientation when taking the at least one calibration image and when taking the at least one exercising image. In some other examples, the person is at a different location and/or has a different orientation between when taking the at least one calibration image and when taking the at least one exercising image.

In some examples, the present method is not limited to the fixed arrangement of the optical device and/or the static behavior of the person relative to the optical device. Owing to the calibration of the length values by way of the length variation factor, changes in position and/or orientation of the optical device and/or the person are compensated for.

In some examples, an angle formed between at least one target plane and at least one optical device plane (camera plane) is less than or equal to 45°, less than or equal to 20°, or equal to or as close as possible to 0°. The at least one target plane comprises: a plane (e.g., first plane) containing the first predetermined body member when the at least one calibration image is taken, and/or a plane (e g, second plane) containing the second predetermined body member when the at least one calibration image is taken, and/or a plane (e.g., third plane) containing the first predetermined body member when the at least one exercising image is taken. Any one of these planes could be, for example, the sagittal plane, the coronal plane, or the transversal plane. The at least one optical device plane comprises one or more planes containing width and height axes of an image taken, e.g., the at least one calibration image, the at least one exercising image.

In some examples, for a more accurate computation of the at least one parameter, the first predetermined body member (or at least two major dimensions thereof) should be contained in a plane that is as close to being parallel to the at least one optical device plane as possible. That way, the calibration for computing the length variation factor may be more precise, which consequently improves the precision with which the at least one parameter is computed.

In some examples, the at least one exercising image comprises a plurality of exercising images. The steps of digitally processing the at least one exercising image, digitally computing the length variation factor, digitally computing the scaled length value, and digitally computing the at least one parameter may be conducted for some or all exercising images of the plurality of exercising images so that the at least one parameter is computed for each of said some or all exercising images.

The computation of the at least one parameter is repeatable a number of times so as to reflect the depth information of the at least one parameter for different exercising images, thereby allowing to monitor the evolution of the at least one parameter between different exercising images and, thus, to monitor the evolution as the person exercises. The plurality of computed parameters can be for a same repetition of an exercise and/or for different repetitions of a same exercise and/or for same or different repetitions of different exercises. It is noted that a physical exercise may involve repeating reorientation and motion of particular body members a number of times before moving on to another physical exercise with similar behavior.

In some examples, as the length variation factor and the scaled length value are both computed every time the at least one parameter is to be computed, the different relative positioning of the first and second body members relative to the optical device when taking each of the exercising images can be compensated for.

In some examples, the at least one parameter at least comprises range of motion in depth. The method may further comprise digitally comparing the range of motion in depth with at least one predetermined range of motion in depth associated with both the at least one predetermined exercise and the at least one predetermined anatomical landmark to determine whether the person has moved the at least one predetermined anatomical landmark according to the at least one predetermined range of motion in depth.

In some examples, the range of motion quantifies how much the at least one predetermined anatomical landmark has moved relative to the at least one other predetermined anatomical landmark. Many physical exercises involve the motion of one or more body members relative to joints thereof for adequate physical rehabilitation of muscles and tendons. The motion in these cases should be such that a certain motion (measured between the concerned body member and another body member, e.g., a neighboring body member) is reached or not exceeded.

When the movement occurs in the depth direction, obtaining the range of motion in depth enables the validation of the achieved motion based on the at least one predetermined range of motion in depth that is associated with the exercise and the landmark itself. By way of example, if the exercise involves lifting a foot towards the back part of the person such that the thigh and the shin form a 90° at the knee joint while the person is upright, the range of motion in depth of the foot or the shin can be computed to determine if it reaches the 90°.

In the event that the range of motion in depth falls within the at least one predetermined range of motion in depth, the method may consider that the at least one predetermined exercise has been correctly executed, meaning that the movement(s) required by the at least one predetermined exercise has been correctly reproduced by the person, but that is if any constraints associated with the predetermined exercise and in addition (if any) to the at least one predetermined range of motion in depth have also been fulfilled. When this is not the case, one or more user-perceptible signals indicative of what has not been adequately done by the person may be provided for feedback purposes.

The use of constraints for the determination of correct execution of exercises or reproduction of movements can be, for example, in the way described in WO2019243438 or corresponding U.S. Patent Application Publication No. 2021/0263598, which are each incorporated by reference in its entirety herein.

In some examples, the at least one calibration image and the at least one exercising image are digitally processed to determine motion and/or rotation of at least one predetermined body member different from the first and second predetermined body members, and the method further comprises determining correct execution of the at least one predetermined exercise by the person when the range of motion in depth falls within the least one predetermined range of motion in depth, and the motion and/or rotation of the at least one predetermined body member fulfills all predetermined constraints associated with both the at least one predetermined exercise and the at least one predetermined body member, and determining incorrect reproduction otherwise.

In some examples, the person has at least one motion tracker arranged on a body member thereof according to a predetermined motion tracker arrangement, each motion tracker including at least one inertial measurement unit (e.g., a gyroscope and/or an accelerometer and/or a magnetometer). The method may further include: digitally processing measurements of the at least one motion tracker taken while the person is in the at least one calibration position and while the person is in the at least one exercising position, thereby obtaining a set of orientation and/or acceleration measurements for the respective body member at different time instants. The method may further include determining correct execution of the at least one predetermined exercise by the person when: the at least one parameter (e.g., range of motion in depth) fulfills a predetermined constraint associated with the exercise and the at least one parameter and the set of orientation and/or acceleration measurements fulfills each predetermined constraint associated with the exercise and the at least one predetermined body member based on values of the measurements at the different time instants.

The optical motion tracking can be combined with inertial motion tracking relying on the arrangement of one or more motion trackers on the person to measure how the body member(s) move and rotate. In some examples, some body members have, thus, their motion tracked with optical means, and some other body member(s) have its/their motion tracked with inertial measurement sensors. The predetermined motion tracker arrangement indicates to the computing device(s) to assess the motion of the concerned body members where each motion tracker is arranged on the body of the person so that the measurements of the motion tracker are associated with particular body members.

In some examples, the two sources of data are separately processed first but are then processed together for determining whether the exercise has been correctly executed or not since all predetermined constraints must be fulfilled to consider that the execution is correct. The constraints for the body members whose motion is tracked with on-body motion trackers can be, for example, the fulfillment of some minimum and maximum angles of body members relative to other body members, and/or the fulfillment of some minimum and maximum accelerations of body members relative to other body members.

In some examples, the method further comprises digitally commanding to provide or providing at least one user-perceptible signal indicative of the at least one predetermined calibration position.

In some examples, the method further comprises digitally commanding to provide or providing at least one user-perceptible signal indicative of the at least one predetermined exercise.

In some examples, the person has at least one visually distinctive device, e.g., visual marker(s), arranged on the predetermined anatomical landmarks thereof for calculation of at least one distance.

Multiple visually distinctive devices may be used, each arranged on a different predetermined anatomical landmark, for easing the detection of locations on the images that are to be used for calculation of distances during the digital processing of images.

The devices are preferably visually different from the area of the person where the device is arranged, e.g., in terms of color or brightness. By way of example, a visually distinctive device can be a green-colored button or a light-emitting device. In some examples, motion trackers to be arranged on the body of the person for tracking motion of the body members thereof are visually distinctive devices at the same time owing to, e.g., the provision of a light-emitting device like an LED, or a color of the motion tracker itself.

A second aspect relates to a method. The method may include digitally processing at least one calibration image of a person taken with an optical device to compute at least two distances between predetermined anatomical landmarks of the person so that at least two calibration length values of a first predetermined body member of the person are computed. The at least one calibration image of the person may be captured while the person is in at least one predetermined calibration position.

The method may further include digitally processing at least one exercising image of the person taken with the optical device to compute at least two distances between predetermined anatomical landmarks of the person so that at least two target length values of the first predetermined body member of the person are computed. The at least one exercising image of the person may be captured while the person is in at least one exercising position corresponding to at least one predetermined exercise to be performed by the person.

In some examples, in each of the at least one predetermined exercise the first predetermined body member is to be moved, each of the at least two target length values corresponding to a distance between the same predetermined anatomical landmarks used for computing the distance of each respective calibration length value.

The method may include digitally computing at least one parameter of the first predetermined body member based on both a first target ratio and a second target ratio. The first target ratio may be between the at least two calibration length values of the first predetermined body member and the second target ratio may be between the at least two target length values of the first predetermined body member.

The at least one parameter may comprise: a difference in depth of at least one predetermined anatomical landmark relative to at least one other predetermined anatomical landmark, and/or a range of motion in depth of the at least one predetermined anatomical landmark relative to the at least one other predetermined anatomical landmark.

As explained before, in some examples, differences between the first and second target ratios are indicative of a movement of the first predetermined body member relative to the optical device in such a way that there has been a change in the extension of the body member along the depth direction. In some examples, the proportions in each target ratio should stay the same when there are no changes in the part, if any, of the body member that is in the depth direction of at least the exercising image(s).

In some examples, to yield accurate results, the segments defining at least one of the calibration length values and defining its respective target length values shall be parallel or substantially parallel. For example, an angle that the two segments form is equal to or less than 10°, or as close to 0° as possible. The segments may have the predetermined anatomical landmarks as endpoints. By fulfilling this constraint, it can be established that any change in the second target ratio is due to changes of the body member in the depth direction.

Also, one or more reference body members, e.g., a second predetermined body member, that is/are to be motionless during the at least one exercise can also be considered, as explained with reference to the first aspect, for compensation of changes in distance or orientation between the person and the optical device. In this sense, in some examples, the method further comprises digitally processing the at least one calibration image to compute at least one distance between predetermined anatomical landmarks of the person so that at least one calibration length value of a second predetermined body member is computed; digitally processing the at least one exercising image to compute at least one distance between predetermined anatomical landmarks of the person so that at least one target length value of a second predetermined body member is computed, the second predetermined body member is not to be moved in each of the at least one predetermined exercise, each at least one target length value corresponding to a distance between the same predetermined anatomical landmarks used for computing the distance of each corresponding at least one calibration length value; and digitally computing a length variation factor, the length variation factor being based on both the at least one calibration length value of the second predetermined body member and the at least one target length value of the second predetermined body member. The method may include digitally computing a scaled length value. The at least one parameter may be digitally computed further based on the length variation factor or the scaled length value.

In some examples, the at least one parameter comprises a depth direction, such as either a direction towards the optical device or a direction away from the optical device.

In some examples, the depth direction is based on at least one biomechanical constraint of the first predetermined body member.

In some examples, the depth direction is based on the at least one predetermined exercise to be performed by the person.

In some examples, the depth direction is based on the digital processing of the at least one calibration image and the at least one exercising image.

In some examples, the method further comprises: digitally commanding to take or taking the at least one calibration image of the person with the optical device; and/or digitally commanding to take or taking the at least one exercising image of the person with the optical device.

In some examples, an angle formed between at least one target plane and at least one optical device plane (camera plane) is less than or equal to 45°, less than or equal to 20°, or equal to or as close as possible to 0°.

In some examples, the at least one exercising image comprises a plurality of exercising images. The steps of digitally processing the at least one exercising image and digitally computing the at least one parameter may be conducted for some or all exercising images of the plurality of exercising images so that the at least one parameter is computed for each of said some or all exercising images.

In some examples, the at least one parameter at least comprises range of motion in depth. The method may further include digitally comparing the range of motion in depth with at least one predetermined range of motion in depth associated with both the at least one predetermined exercise and the at least one predetermined anatomical landmark to determine whether the person has moved the at least one predetermined anatomical landmark according to the at least one predetermined range of motion in depth.

In some examples, the at least one calibration image and the at least one exercising image are digitally processed to determine motion and/or rotation of at least one predetermined body member different from the first predetermined body members. The method may further include determining correct execution of the at least one predetermined exercise by the person when the range of motion in depth falls within the least one predetermined range of motion in depth, and the motion and/or rotation of the at least one predetermined body member fulfills all predetermined constraints associated with both the at least one predetermined exercise and the at least one predetermined body member, and determining incorrect reproduction otherwise.

In some examples, the person has at least one motion tracker arranged on a body member thereof according to a predetermined motion tracker arrangement, each motion tracker including at least one inertial measurement unit. The method may further include: digitally processing measurements of the at least one motion tracker taken while the person is in the at least one calibration position and while the person is in the at least one exercising position, thereby obtaining a set of orientation and/or acceleration measurements for the respective body member at different time instants. The method may further include determining correct execution of the at least one predetermined exercise by the person when: the at least one parameter (e.g. range of motion in depth) fulfills a predetermined constraint associated with the exercise and the at least one parameter and the set of orientation and/or acceleration measurements fulfills each predetermined constraint associated with the exercise and the at least one predetermined body member based on values of the measurements at the different time instants.

In some examples, the method further comprises digitally commanding to provide or providing at least one user-perceptible signal indicative of the at least one predetermined calibration position.

In some examples, the method further comprises digitally commanding to provide or providing at least one user-perceptible signal indicative of the at least one predetermined exercise.

In some examples, the person has at least one visually distinctive device, e.g., visual marker(s), arranged on predetermined anatomical landmarks thereof for calculation of at least one distance.

A third aspect relates to a computing device. The computing device may include at least one processor and at least one memory. Further, the at least one memory may be configured, together with the at least one processor, to cause the computing device to carry out the steps of a method as described in the first aspect or the second aspect.

In some examples, the computing device comprises an optical device.

In some examples, the computing device is configured to be communicatively coupled with an optical device that may not be part of the computing device.

A fourth aspect relates to a data processing device. The data processing device may include means or modules for carrying out the steps of a method as described in the first aspect or the second aspect.

A fifth aspect relates to a motion tracking system. The motion tracking system may include a computing device, for example, as described in the third aspect or the fourth aspect, and an optical device communicatively coupled with the computing device.

In some examples, the motion tracking system further comprises a plurality of motion trackers, each motion tracker being adapted for arrangement on a body member of a person and comprising one or more inertial measurement sensors.

A sixth aspect relates to a computer program. The computer program may include instructions which, when the program is executed by at least one computing apparatus, cause the at least one computing apparatus to carry out the steps of a method as described in the first aspect or the second aspect.

A seventh aspect relates to a computer-readable non-transitory storage medium. The storage medium may include instructions which, when executed by at least one computing apparatus, cause the at least one computing apparatus to carry out the steps of a method as described in the first aspect or the second aspect.

An eighth aspect relates to a data carrier signal carrying a computer program as described in the sixth aspect.

As mentioned, computer vision systems utilizing optical devices, such as cameras, may have difficulty accurately detecting or quantifying the motion of a person's body parts when those parts are oriented at least partially such that their movement occurs perpendicular to the image plane captured by the camera. Examples described herein may provide a technical solution to this problem by using values measured in calibration and exercising images to calculate one or more parameters indicative of depth-related information associated with a moving body part. Examples described herein may thus improve the ability of a motion tracking system to estimate the "uncaptured" depth dimension and process images from optical devices to establish the positioning and movement of body parts extending along the depth axis relative to the image plane.

FIG. 1A shows a person 10 in front of an optical device 20, according to some examples. The optical device 20 may be or include a camera, remote from the person 10, while the person 10 is standing upright. From FIG. 1A alone, the optical device 20 and possibly the reader could not tell whether the person 10 is completely upright, meaning that the chest predominantly extends along width W and height H dimensions of images 22 taken by the optical device 20. The image 22 represented with a short-dashed line is shown, together with diagonal long-dashed lines originating from the optical device 20, have been illustrated for the sake of clarity only.

FIG. 1B, showing a side view of the person 10 at a distance from the optical device 20, according to some examples. FIG. 1B would let the reader determine that the person 10 is in fact upright as the height (or length) of the chest of the person is substantially aligned with the height H dimension of the image 22.

Turning to FIG. 2, which is also a side view like that of FIG. 1B, the person 10 is represented in three different positions that help to illustrate the difficulty that computer vision techniques may have to establish how the person is positioned when a body member thereof may not completely or substantially extend in the two dimensions of images taken by the optical device 20, according to some examples. The depth dimension for the images taken by an optical device and, thus, the depth dimension for the computer vision techniques is represented with double-ended arrow line D in FIG. 1B; in FIG. 1A, the depth dimension goes inside the sheet and comes out from the sheet.

On the right-most representation of the person 10 in FIG. 2, the person 10 is slightly leaning back, whereas on the center and left-most representations of the person 10, the person 10 is leaning forward with different leaning angles.

Calculation of, for example, the leaning angle relative to the hip is possible with methods, computer-implemented methods, devices, systems, computer programs and computer storage media according to the present disclosure.

Despite only three positions being shown in FIG. 2, it will be apparent that many more positions of the chest are possible, both between any pair of chest positions and beyond the edge chest positions illustrated in FIG. 2.

Although the problem has been illustrated with reference to the chest of the person, it will be noted that the same may occur for many other body members as well, and the present disclosure is applicable to any such other body members of the person too. It is noted that if the optical device 20 were to be at the position of the reader of the document, the detection and processing of the leaning of the person 10 would be possible with much lower complexity because the relevant dimensions of the chest would be contained in the optical device plane. In such cases, the depth direction would be along the dimension of the person going from one arm to the other arm.

Figure 3:
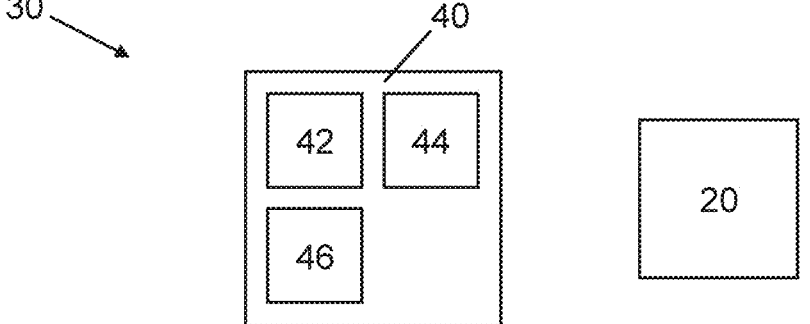
FIG. 3 shows a system in accordance with some examples.

FIG. 3 shows a motion tracking system 30 in accordance with some examples.

The system 30 comprises a computing device 40 and an optical device 20. The computing device 40 is, for example, a personal computer, a mobile phone, a tablet, an application-specific integrated circuit, or an alike device. The optical device 20 is, for example, a digital camera. In some examples, the optical device 20 is part of the computing device 40.

The computing device 40 comprises at least one processor 42, at least one memory 44, and a communications module 46 at least for receiving images from the optical device 20. When the optical device 20 is separate from the computing device 40, the communications between the devices may be wireless or wired.

The motion tracking system 30 may be adapted for the physical rehabilitation or recovery of a patient. The computing device 40 may communicate with one or more motion trackers worn by the patient during physical therapy (e.g., to obtain measurements taken by an inertial measurement unit of the motion tracker). In some examples, the computing device 40 provides a user interface that provides the patient with, for example, instructions or feedback with respect to positions, movements or exercises to be performed in the context of physical therapy.

As mentioned, a method may include digitally commanding to provide or providing at least one user-perceptible signal indicative of at least one predetermined calibration position. Accordingly, in some examples, the motion tracking system 30 (e.g., via the computing device 40) may instruct the person 10 to position themselves in a calibration position, resulting in one or more images of the person 10 being captured by the motion tracking system 30 (e.g., via the optical device 20) while the person 10 is in the calibration position.

As also mentioned, the method may include digitally commanding to provide or providing at least one user-perceptible signal indicative of the at least one predetermined exercise. Accordingly, in some examples, the motion tracking system 30 (e.g., via the computing device 40) may instruct the person 10 to perform a certain exercise, resulting in one or more images of the person 10 being captured by the motion tracking system 30 (e.g., via the optical device 20) while the person 10 is in one or more exercising positions.

Figure 4:
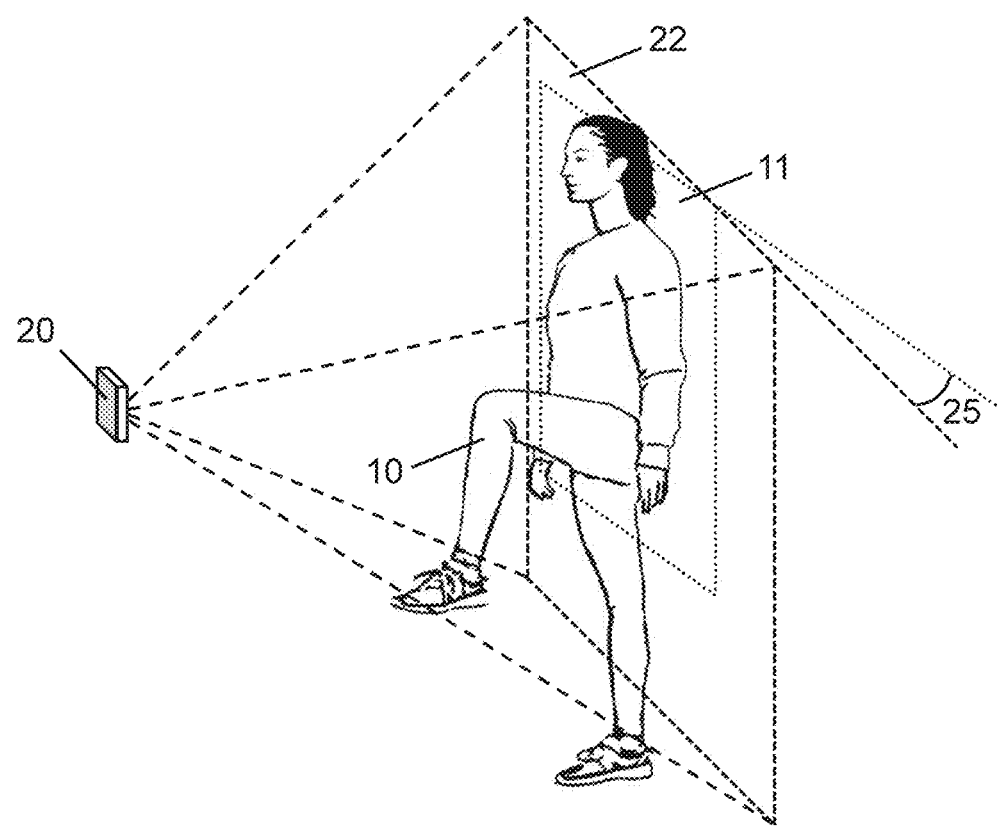
FIG. 4 shows a person doing a hip and knee flexion exercise in front of an optical device, according to some examples.

FIG. 4 shows a person 10 doing a hip flexion, with knee flexion, while their motion is tracked with an optical device 20, according to some examples.

Like in FIG. 1A and FIG. 1B, a representation of an image 22 taken by the optical device 20 is illustrated, in this case an exercising image as it is taken during the predetermined exercise of the hip and knee flexion movement. The plane illustrated as being the image 22 is an optical device plane or camera plane.

A target plane 11 is likewise illustrated with dotted lines. The target plane 11 is a plane containing the chest or the major dimensions of the chest of the person when the exercising image 22 is being taken. The chest corresponds, in this example, to the reference predetermined body member that will be used for calibration purposes. It may be beneficial if the angle 25 formed between the target plane 11 and the optical device plane is as small as possible for major alignment between the two, e.g., at least not greater than 45°.

Figure 5A:
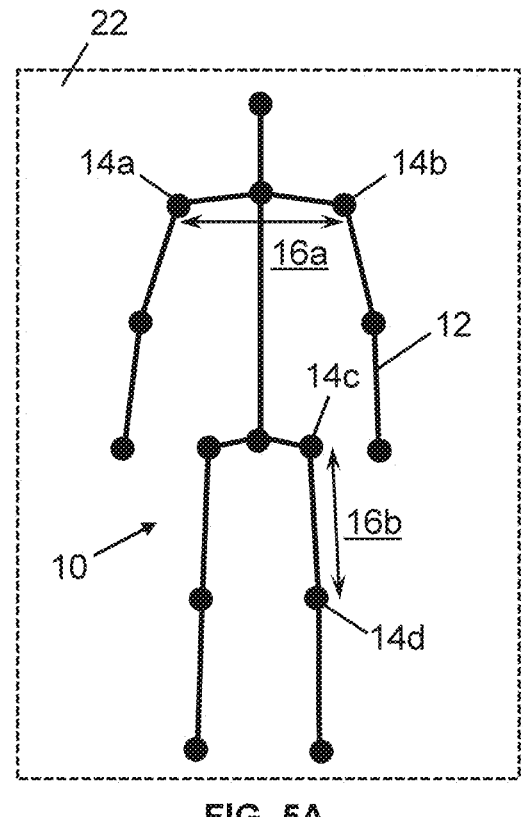
FIG. 5A shows a simplified representation of several segments and joints of a person in a first set of positions, according to some examples.
Figure 5B:
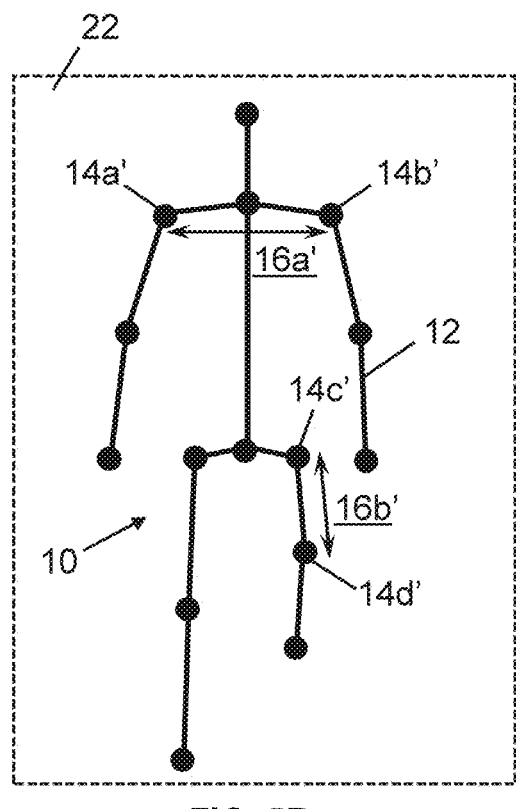
FIG. 5B shows the simplified representation of FIG. 5A with the segments and joints in a second set of positions, according to some examples.

FIG. 5A and FIG. 5B show a simplified representation of several segments 12 and joints 14*a*-14*d*, 14*a'*-14*d'* of a person 10 in two different positions, according to some examples. A calibration position is shown in the representation of FIG. 5A, and an exercising position is shown in the representation of FIG. 5B. The exercising position takes place during the performance of the hip and knee flexions exercise of FIG. 4. The representations of FIG. 5A and FIG. 5B are of respective calibration and exercising images 22. For the sake of the example, it is considered that an optical device is in front of the person 10 like in FIG. 4, and that the part of the person seen in FIG. 5A and FIG. 5B is the front of the person.

In the calibration position of FIG. 5A, the person is standing still in an upright position, e.g., with all body members relaxed. In a hip and knee flexion exercise, in this example of the left leg, the left thigh extending between the left hip 14*c* and the left knee 14*d* is to be lifted. The chest remains substantially still during the hip and knee flexion and is, thus, an appropriate body member for calibration purposes, but other body members could be used as well, for example the right leg, the right shin, or any arm.

Therefore, a calibration length value 16*a* of the chest is measured as the distance between two anatomical landmarks, which in this case are the right and left shoulder joints 14*a*, 14*b* with coordinates in the image 22, e.g., ($x_{RS}$, $y_{RS}$) and ($x_{LS}$, $y_{LS}$), respectively, which means that the calibration length value 16*a* corresponds to a width dimension of the chest. Further calibration length values of the chest may be computed for improving the calibration; other anatomical landmarks (not necessarily joints) could be used instead of the shoulder joints 14*a*, 14*b*, and a different distance measurement could be made, for instance in the vertical dimension also captured in images taken with the optical device. By contrast, the depth dimension, which is, for example, the dimension going from the belly button to the back of the person, is the one that is not properly captured in the images taken. A calibration length value 16*b* of the left thigh is also computed, in this case between the left hip joint 14*c* and the left knee joint 14*d* with coordinates in the image 22, e g, ($x_H$, $y_H$) and ($x_K$, $y_K$), respectively. In this case, at least one calibration length value 16*b* of the left thigh shall be that corresponding to the dimension that may be obscured by the inability of the optical device to register the depth dimension, which in this case is the length of the thigh as it is the segment that will progressively have a larger component along the depth dimension.

As mentioned, identification of the relevant anatomical landmarks and measurement of distances may be made with any computer vision techniques known in the art, e.g., by using the optical device 20 and the computing device 40, or another computing device in the motion tracking system 30.

In FIG. 5B, the same anatomical landmarks of FIG. 5A have been referenced with prime to denote that they can be at a different position relative to the positioning of FIG. 5A.

The left thigh is lifted such that the left knee joint 14*d'* is still at a lower height than the left hip joint 14*c'*. At least one target length value 16*a'* is computed for the chest, which is again computed by measuring the distance between the same anatomical landmarks used for the computation of the respective calibration length value 16*a*, in this case the right and left shoulder joints 14*a'*, 14*b'* with coordinates in the image 22, e.g., ($x_{RS}'$, $y_{RS}'$) and ($x_{LS}'$, $y_{LS}'$), respectively. Similarly, at least one target length value 16*b'* is computed for the left thigh according to the distance between the left hip joint 14*c'* and the left knee joint 14*d'* with coordinates in the image 22, e.g., ($x_H'$, $y_A'$) and ($x_K'$, $y_K'$), respectively. The distance calculation can be made, for instance, by measuring the distance in pixels between the two anatomical landmarks forming the segment. Due to the rotation of the left thigh relative to the hip that has caused the left knee joint 14*d'* to be higher and the left thigh to vary the angle it forms relative to, e.g., the chest, the distance between the joints 14*c'*, 14*d'* is shorter in the image 22 of FIG. 5B than in the image of FIG. 5A and, thus, the target length value 16*b'* is shorter than the calibration length value 16*b*, even though the length of the thigh remains the same, it is just that the component in the depth dimension does not get reflected in the image 22.

By processing the calibration and target length values 16*a*, 16*a'* of the reference body member, namely the chest, a length variation factor can be computed (e.g., by the computing device 40). For example, such variation factor can be the ratio between the two length values. Then, the calibration length value 16*b* of the left thigh is scaled to a scaled length value by means of the length variation factor, thereby accounting for the possible length variation due to relative angle or distance changes between the person and the optical device that may have occurred during the taking of the calibration and target images. By processing the scaled length value and the at least one target length value 16*b'* of the left thigh in the exercising image, the at least one parameter with respect to the depth dimension can be computed. An example of such computation is explained with reference to FIG. 6.

Figure 6:
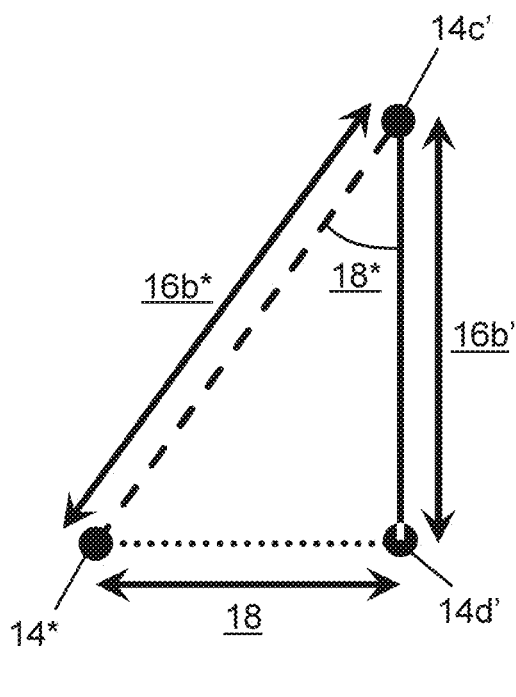
FIG. 6 shows a manner of computing a parameter related to a body member as it is at least partly extending in a direction towards an optical device, either closer thereto or farther therefrom, according to some examples.

FIG. 6 shows a way of computing a parameter related to a body member as it is at least partly extending in a direction towards an optical device taking the images, either closer thereto or farther therefrom, according to some examples. The way relies on a trigonometrical relationship. For the sake of clarity only, the same example of FIG. 5A and FIG. 5B will be considered for the explanation, and components of the motion tracking system 30 may be used to perform capturing and processing.

FIG. 6 shows a triangle with two vertices corresponding to the left hip joint 14*c'* and left knee joint 14*d'* in the exercising image of FIG. 5B. The target length value 16*b'* of the left thigh takes the edge between these two vertices 14*c'*, 14*d'*. The triangle is formed to be a right triangle. The longest edge corresponds to the scaled length value 16*b*\* is computed (e.g., by the computing device 40). The scaled length value 16*b*\* represents the length that should have appeared in the exercising image for the left thigh if it was not partly in the depth dimension.

As the triangle is a right triangle, the two edges and the two vertices already define the third edge 18 and the third vertex 14\*. The third edge 18 provides a length in the depth dimension relative to an anatomical landmark, in this case relative to the left hip joint 14*c*'. Thus, the length of the third edge 18 measures the distance that the left knee goes in the depth dimension with respect to the left hip. Likewise, an angle 18\* can be considered. Said angle 18\* represents the range of motion in depth dimension for the left shin relative to the left thigh measured in the images taken by the optical device. As it is apparent though, with just the edges 16*b*' and 16*b*\*, the arccosine of 18\* could be computed, and use the sine of said angle 18\* to find the length of the third edge 18.

Any or both of the length of the third edge 18 and the angle 18\* can be part of a parameter to be obtained for the left thigh, or any other body member if the same procedure were to be reproduced for other body members. In this regard, it is noted that the hip and knee flexion exercise illustrated in FIG. 4, FIG. 5A and FIG. 5B is merely an exemplary exercise, and any other exercise could be considered instead. Additionally, even though the method has been described considering the person to be facing an optical device, e.g., a camera, the person could be positioned sideways, back to the camera, or any other orientation in-between when the images are taken. In such cases, different rotations of body members will be computable with the disclosed method having regard that the rotations make an anatomical landmark to rotate relative to another anatomical landmark (for instance an anatomical landmark of a neighboring body member) such that it gets closer or farther from the optical device and the concerned body member at least partly extends in the depth dimension of the images taken.

Once the parameter has been determined, the motion tracking system 30 may use the parameter in a motion tracking process. For example, output generated by the computing device 40 indicative of the parameter may be used to improve the processing of images from the optical device 20 to better establish how a body member is positioned or moves when at least partly extending along the depth dimension of the optical device 20.

Figure 7A:
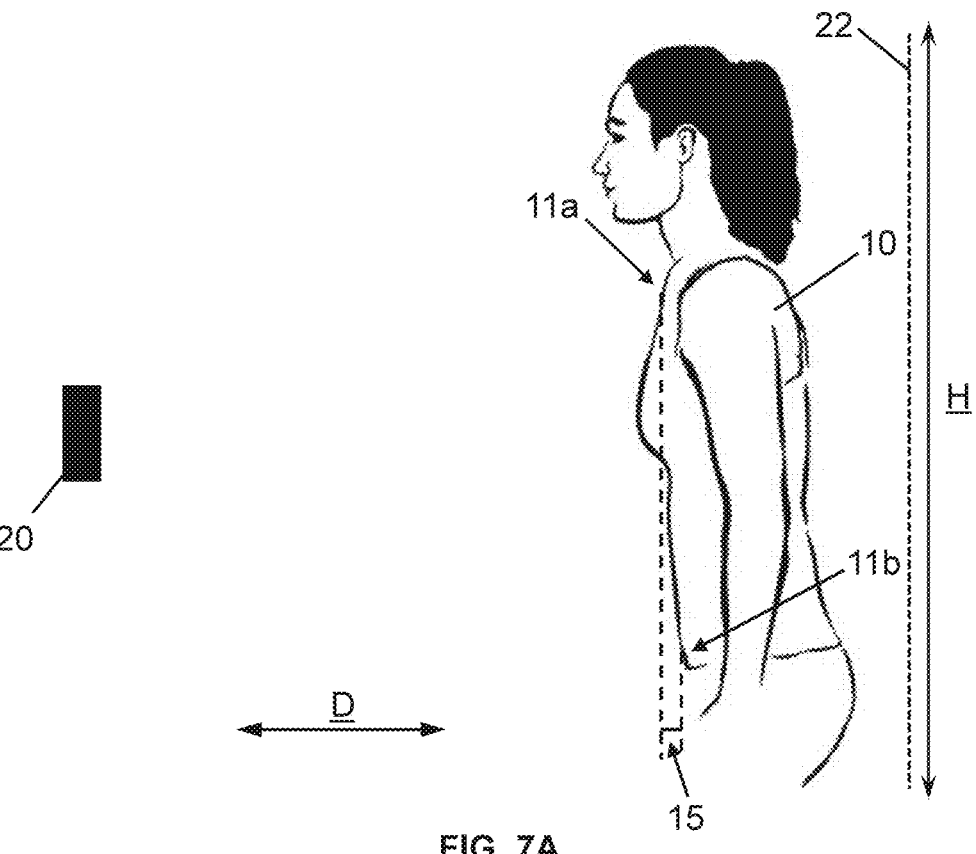
FIG. 7A shows, from the side, a person in front of an optical device, according to some examples.
Figures 7B, 8A, 8B:
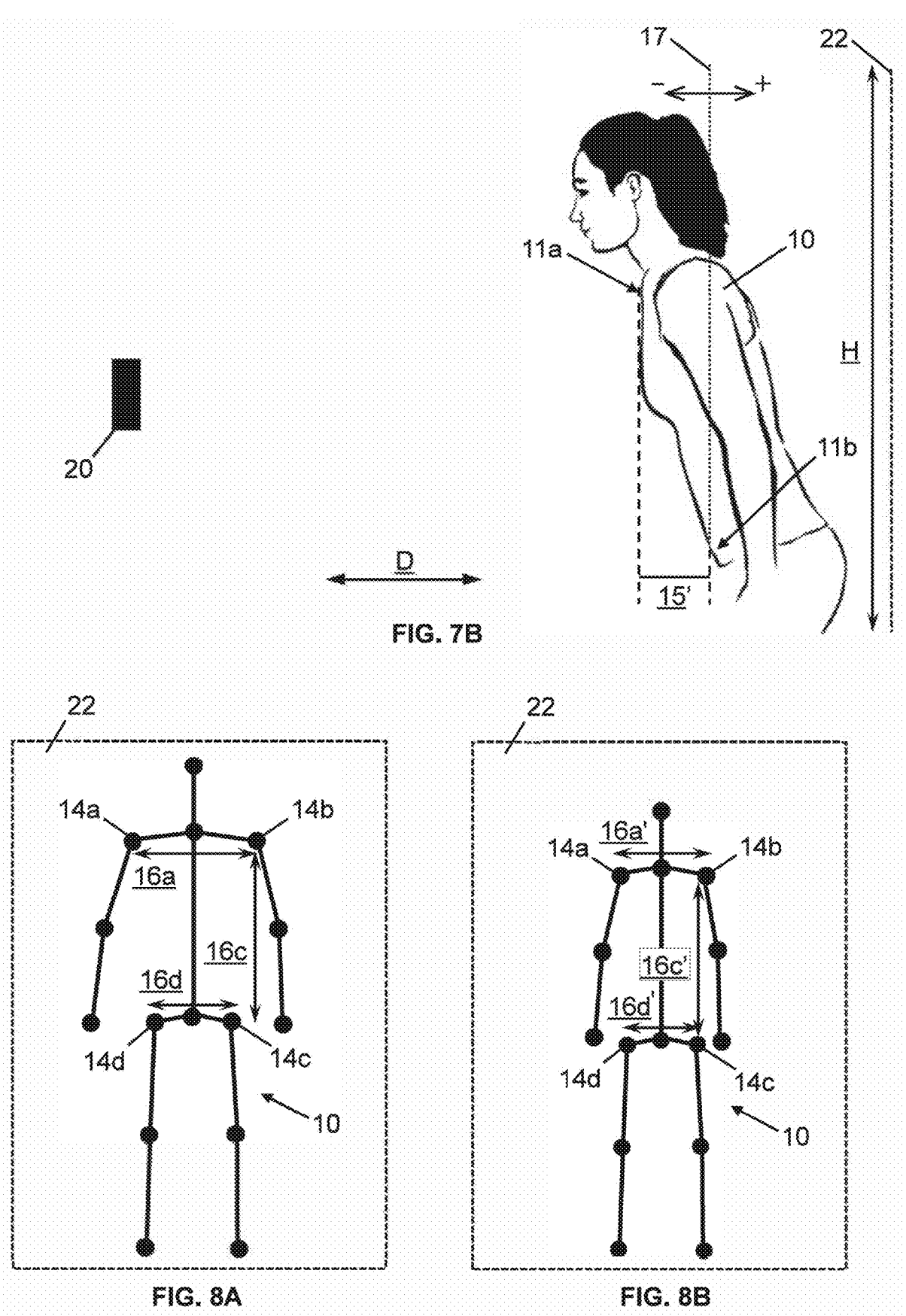
FIG. 7B shows, from the side, the person of FIG. 7A in front of the optical device, with FIG. 7A and FIG. 7B illustrating how a change in depth is assessed, according to some examples.
FIG. 8A shows a simplified representation of several segments and joints of a person, according to some examples.
FIG. 8B shows a simplified representation of several segments and joints of a person, with FIG. 8A and FIG. 8B illustrating a manner of computing a parameter related to a body member as it at least partly extends in a direction towards an optical device, according to some examples.

FIG. 7A and FIG. 7B show how a change in depth is assessed in some examples. A person 10 is illustrated performing a leaning forward exercise.

In FIG. 7A and FIG. 7B, an anatomical landmark 11*a* of the person 10 to be assessed as part of the exercise is a middle point between shoulders of the person 10. To keep track of the movement, a reference anatomical landmark 11*b* of the person 10 is chosen to be a middle point between hips of the person 10. The two landmarks 11*a*, 11*b* used may correspond to the respective points at the front-most part of the person 10, which is what is captured in the images 22 taken.

In a calibration position like that illustrated in FIG. 7A, each landmark 11*a*, 11*b* is at a certain depth position in the depth direction D that is dependent on the orientation of the optical device 20. In that situation, the landmark 11*a* to move is closer to the optical device 20 than the reference landmark 11*b*, and there is a distance 15 in the depth direction D between the two.

In an exercising position like that illustrated in FIG. 7B, the person 10 is more distant from the optical device 20 because the person 10 has inadvertently gone a few steps back from the optical device 20. The person 10 leans forward such that the moving landmark 11*a* is closer to the optical device 20 than the reference landmark 11*b*. The leaning has caused the distance 15' in depth direction D between the two landmarks 11*a*, 11*b* to be greater, which is indicative of the range of motion.

Even though the moving landmark 11*a*, namely the middle point between the shoulders, is at a greater distance from the optical device 20 in the image taken by the optical device 20 in the exercising position than in the calibration position, the movement in the depth direction D is determined as being towards the optical device 20. This is so because if the reference landmark 11*b* is taken to define a reference axis 17 (shown with a dotted line in FIG. 7B for illustrative purposes only) parallel to the one of the axes of the camera plane (e.g., axis H of the image 22), the distance 15' is greater and the moving landmark 11*a* is in the negative part (see arrow with minus symbol '-' at the top of the reference axis 17) of such reference axis 17. If the person 10 had leaned back and the new distance 15' between the two landmarks 11*a*, 11*b* had become shorter while the moving landmark 11*a* stayed in the negative part, or the new distance 15' had become zero or any other value but with the moving landmark 11*a* staying on the positive part (see arrow with plus symbol '+' at the top of the reference axis 17) relative to the reference axis 17 touching the reference landmark 11*b*, the movement in the depth direction D would be moving away from the optical device 20.

It is noted that the distance 15', which is a relative distance between landmarks in the depth direction D, and the range of motion owing to the change in the distance can be estimated in examples of the present disclosure.

FIG. 8A and FIG. 8B show a manner of computing a parameter related to a body member as it at least partly extends in a direction towards an optical device, according to some examples. FIG. 8A shows a calibration image of a person 10 represented as segments 12 and joints 14*a*-14*d*, whereas FIG. 8B shows an exercising image of the person. For the sake of the example, it is considered that an optical device is in front of the person 10 like in FIG. 4, and that the part of the person 10 seen in FIG. 8A and FIG. 8B is the front of the person.

In the calibration image 22 of FIG. 8A, the person is standing still in an upright position, e.g., with all body members relaxed. A first calibration length value 16*a* of a first predetermined body member, in this case the chest, is provided as the distance between, e.g., the shoulders. A second calibration length value 16*c* of the chest is provided as the distance between, e.g., the person's left hip 14*c* and the person's left shoulder 14*b*. When two or more calibration length values of a same body member are measured, the calibration length values may correspond to perpendicular dimensions, like in the present example where the two calibration length values 16*a*, 16*c* are according to two perpendicular axes contained in a coronal plane of the person 10. The calibration length values correspond to segments defined by the anatomical landmarks of the person 10 that are as parallel to the optical device plane as possible.

In this example, one calibration length value 16*d* is provided for a second predetermined body member, in this case the waistline extending between the left hip 14*c* and the right hip 14*d*. In other examples, none, one or more than one calibration length values for the second predetermined body member are provided.

In the exercising image 22 of FIG. 8B, the person 10 has the upper portion of the body rotated around the spine such that the person's left arm is farther from the optical device than the person's right arm.

Respective target length values 16a', 16c', 16d' are provided for the different body members, namely the chest and the waistline.

A first target ratio can be computed as the first calibration length value 16a divided by the second calibration length value 16c (the result of which is 0.72), or vice versa. A second target ratio can be computed as the first target length value 16a' divided by the second target length value 16c' (the result of which is 0.63), or vice versa if the first target ratio is also computed as the opposite ratio, or as a first scaled length value divided by a second scaled length value.

A second target ratio that is greater or lower than the first target ratio will then be used to calculate at least one parameter relative to the depth dimension of the exercising image 22. In the event that there is no change in the component of the chest along the depth direction in the images 22, the first and second target ratios must be the same or substantially similar to account for inaccurate measuring of length values. Considering the rotation around the spine of the person 10 of FIG. 8A and FIG. 8B, with trigonometrical relationships the component of the chest along the depth direction can be obtained, for example applying such relationships to a division of one of the target ratios by the other one of the target ratios.

Segments defining calibration and target lengths values of the chest can be used as a reference as well. By way of example, the segment defining the target length value 16c' corresponding to the height of the chest forms an angle of 0° with the segment defining the respective calibration length value 16c. This angle indicates that the second target ratio has changed not because the person 10 has repositioned themselves relative to the optical device in such a way that the concerned body member, in this case the chest, is not contained in the optical device plane.

Additionally or alternatively, since the exercise involves the movement of the upper part of the body but not of the lower part of the body, the waistline may be used as a reference body member, for example. A length variation factor can be computed from the target length value 16d' and the calibration length value 16d of the waistline. The length variation factor reveals that the distance between the person 10 and the optical device has become greater because the target length value 16d' is smaller than the calibration length value 16d. A length variation factor and/or a scaled length value may then be provided for one or several calibration length values 16a, 16c of the chest to compensate for the change in distance.

Again, once the parameter has been determined, the motion tracking system 30 may use the parameter in a motion tracking process. For example, output generated by the computing device 40 indicative of the parameter may be used to improve the processing of images from the optical device 20 to better establish how a body member is positioned or moves when at least partly extending along the depth dimension of the optical device 20.

In this text, the terms "calibration length value", "target length value", "length variation factor", and "scaled length value" have been used for the sake of clarity only. These terms could also be referred to as lengths or values (for the length values), and factor or constant (for the variation factor), for example. Also, the terms "first", "second", "third", etc. have been used herein to describe several elements, devices or parameters, it will be understood that the elements, devices or parameters should not be limited by these terms since the terms are only used to distinguish one element, device or parameter from another.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the term "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. As used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

Although some examples may include a particular sequence of operations, the sequence may in some cases be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method performed by a motion tracking system, the method comprising: capturing, by an optical device of the motion tracking system, a calibration image of a person while the person is in a predetermined calibration position; processing, by at least one computing device of the motion tracking system, the calibration image to determine at least two calibration length values based on distances between anatomical landmarks associated with at least one body member in the calibration image; capturing, by the optical device, an exercising image of the person while the person is in an exercising position corresponding to a predetermined exercise; processing, by the at least one computing device, the exercising image to determine at least two target length values based on distances between the anatomical landmarks associated with the at least one body member in the exercising image; determining, by the at least one computing device and based on the calibration length values and the target length values, at least one depth-related parameter associated with a target body member of the at least one body member, wherein depth is in a direction perpendicular to two other directions corresponding to two dimensions captured by the optical device in the calibration image and the exercising image; and using, by the at least one computing device, the at least one depth-related parameter to track motion of the person with respect to the predetermined exercise.

In Example 2, the subject matter of Example 1 includes, wherein the target body member has a first anatomical landmark in a position relative to a second anatomical landmark that differs between the calibration image and the exercising image, and the at least one depth-related parameter comprises at least one of: a difference in the depth of the first anatomical landmark relative to the second anatomical landmark, and a range of motion in depth of the first anatomical landmark relative to the second anatomical landmark.

In Example 3, the subject matter of Example 2 includes, wherein the at least one depth-related parameter comprises the range of motion in depth, and wherein the using of the at least one depth-related parameter to track the motion of the person comprises: comparing, by the at least one computing device, the range of motion in depth with at least one predetermined range of motion in depth associated with the predetermined exercise; and determining, by the at least one computing device and based on the comparison, whether the person has moved the first anatomical landmark relative to the second anatomical landmark according to the at least one predetermined range of motion in depth associated with the predetermined exercise.

In Example 4, the subject matter of any of Examples 1-3 includes, wherein the at least one body member comprises a first body member and a second body member, wherein the at least two calibration length values comprise, for each body member of the first body member and second body member of the person, a calibration length value based on a distance between the anatomical landmarks that are associated with the body member in the calibration image, wherein the at least two target length values comprise, for each body member of the first body member and second body member of the person, a target length value that is based on a distance between the anatomical landmarks that are associated with the body member in the exercising image, and wherein each target length value corresponds to the distance between the same anatomical landmarks used for determining the distance of each corresponding calibration length value.

In Example 5, the subject matter of Example 4 includes, wherein the target body member is the second body member, and in the predetermined exercise the first body member is not to be moved and the second body member is to be moved.

In Example 6, the subject matter of Example 5 includes, wherein determining the at least one depth-related parameter associated with the target body member comprises: determining, by the at least one computing device, a length variation factor based on the calibration length value of the first body member and the target length value of the first body member; determining, by the at least one computing device, a scaled length value associated with the second body member based on the calibration length value of the second body member and the length variation factor; and determining, by the at least one computing device, the at least one depth-related parameter based on the scaled length value and the target length value of the second body member.

In Example 7, the subject matter of Example 6 includes, wherein determining the at least one depth-related parameter comprises calculating a trigonometrical relationship between the scaled length value and the target length value of the second body member.

In Example 8, the subject matter of any of Examples 4-7 includes, wherein in the predetermined exercise the first body member stays substantially motionless, and the second body member is to be moved such that at least a first anatomical landmark of the second body member moves relative to a second anatomical landmark or such that the second body member rotates relative to the second anatomical landmark.

In Example 9, the subject matter of any of Examples 1-8 includes, capturing one or more additional exercising images; and determining the at least one depth-related parameter associated with the target body member for each of the one or more additional exercising images.

In Example 10, the subject matter of any of Examples 1-9 includes, wherein the at least two calibration length values are calibration length values of a first body member of the person, and the at least two target length values are target length values of the first body member of the person, each target length value corresponding to the distance between the same anatomical landmarks used for determining the distance of each corresponding calibration length value, and wherein the at least one depth-related parameter is determined based on a first target ratio and a second target ratio, the first target ratio being between the at least two calibration length values of the first body member and the second target ratio being between the at least two target length values of the first body member.

In Example 11, the subject matter of any of Examples 1-10 includes, wherein the at least one depth-related parameter indicates the direction as either towards the optical device or away from the optical device.

In Example 12, the subject matter of Example 11 includes, wherein the direction is based on at least one biomechanical constraint of the target body member.

In Example 13, the subject matter of any of Examples 11-12 includes, wherein the direction is based on the predetermined exercise.

In Example 14, the subject matter of any of Examples 1-13 includes, wherein the optical device is at a same location and has a same orientation when capturing the calibration image and when capturing the exercising image.

In Example 15, the subject matter of any of Examples 1-14 includes, wherein the motion tracking system comprises a motion tracker arranged on the person, the motion tracker including an inertial measurement unit, and the method further comprising: processing measurements of the motion tracker taken while the person is in the predetermined calibration position and while the person is in the exercising position, thereby obtaining a set of measurements at different time instants; detecting that the at least one depth-related parameter and the set of measurements fulfill one or more predetermined constraints associated with the predetermined exercise; and determining, based on the detection, that the predetermined exercise has been correctly executed.

In Example 16, the subject matter of any of Examples 1-15 includes, wherein the motion tracking system comprises a motion tracker arranged on the person, the motion tracker including an inertial measurement unit, and the method further comprising: processing measurements of the motion tracker taken while the person is in the predetermined calibration position and while the person is in the exercising position, thereby obtaining a set of measurements at different time instants; detecting that the at least one depth-related parameter and the set of measurements do not fulfill one or more predetermined constraints associated with the predetermined exercise; and determining, based on the detection, that the predetermined exercise has not been correctly executed.

In Example 17, the subject matter of any of Examples 1-16 includes, providing, by the motion tracking system and prior to the capturing of the calibration image, at least one user-perceptible signal indicative of the predetermined calibration position to instruct the person to assume the predetermined calibration position.

In Example 18, the subject matter of any of Examples 1-17 includes, providing, by the motion tracking system and prior to the capturing of the exercising image, at least one user-perceptible signal indicative of the predetermined exercise to instruct the person to perform the predetermined exercise.

Example 19 is a motion tracking system comprising at least one computing device and an optical device, the motion tracking system being configured to perform operations comprising: capturing, by the optical device, a calibration image of a person while the person is in a predetermined calibration position; processing, by the at least one computing device, the calibration image to determine at least two calibration length values based on distances between anatomical landmarks associated with at least one body member in the calibration image; capturing, by the optical device, an exercising image of the person while the person is in an exercising position corresponding to a predetermined exercise; processing, by the at least one computing device, the exercising image to determine at least two target length values based on distances between the anatomical landmarks associated with the at least one body member in the exercising image; determining, by the at least one computing device and based on the calibration length values and the target length values, at least one depth-related parameter associated with a target body member of the at least one body member, wherein depth is in a direction perpendicular to two other directions corresponding to two dimensions captured by the optical device in the calibration image and the exercising image; and using, by the at least one computing device, the at least one depth-related parameter to track motion of the person with respect to the predetermined exercise.

In Example 20, the subject matter of Example 19 includes, a motion tracker being adapted for arrangement on the person, the motion tracker including an inertial measurement unit.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

The invention claimed is:

1. A method performed by a motion tracking system, the method comprising:

capturing, by an optical device of the motion tracking system, a calibration image of a person while the person is in a predetermined calibration position;

processing, by at least one computing device of the motion tracking system, the calibration image to determine at least two calibration length values based on distances between anatomical landmarks associated with at least one body member in the calibration image;

capturing, by the optical device, an exercising image of the person while the person is in an exercising position corresponding to a predetermined exercise;

processing, by the at least one computing device, the exercising image to determine at least two target length values based on distances between the anatomical landmarks associated with the at least one body member in the exercising image;

determining, by the at least one computing device and based on the at least two calibration length values and the at least two target length values, at least one depth-related parameter associated with a target body member of the at least one body member, wherein the at least one depth-related parameter comprises a range of motion in depth of a first anatomical landmark of the target body member relative to a second anatomical landmark of the target body member, and wherein the depth is in a direction perpendicular to two other directions corresponding to two dimensions captured by the optical device in the calibration image and the exercising image;

using, by the at least one computing device, the at least one depth-related parameter to track motion of the person with respect to the predetermined exercise; and determining, by the at least one computing device, whether the person has moved the first anatomical landmark relative to the second anatomical landmark according to at least one predetermined range of motion in depth associated with the predetermined exercise.

2. The method of claim 1, wherein the first anatomical landmark is in a position relative to the second anatomical landmark that differs between the calibration image and the exercising image, and the at least one depth-related parameter further comprises a difference in the depth of the first anatomical landmark relative to the second anatomical landmark.

3. The method of claim 1, wherein the using of the at least one depth-related parameter to track the motion of the person comprises:

comparing, by the at least one computing device, the range of motion in depth with the at least one predetermined range of motion in depth associated with the predetermined exercise.

4. The method of claim 1, wherein the at least one body member comprises a first body member and a second body member, wherein the at least two calibration length values comprise, for each body member of the first body member and second body member of the person, a calibration length value based on a distance between the anatomical landmarks that are associated with the body member in the calibration image, wherein the at least two target length values comprise, for each body member of the first body member and second body member of the person, a respective target length value that is based on a respective distance between the anatomical landmarks that are associated with the body member in the exercising image, and wherein each respective target length value corresponds to the distance between the same anatomical landmarks used for determining the distance of each corresponding calibration length value.

5. The method of claim 4, wherein the target body member and the second body member are the same body member, and in the predetermined exercise the first body member is not to be moved and the second body member is to be moved.

6. The method of claim 5, wherein determining the at least one depth-related parameter associated with the target body member comprises:

determining, by the at least one computing device, a length variation factor based on the calibration length value of the first body member and the target length value of the first body member;

determining, by the at least one computing device, a scaled length value associated with the second body member based on the calibration length value of the second body member and the length variation factor; and determining, by the at least one computing device, the at least one depth-related parameter based on the scaled length value and the target length value of the second body member.

7. The method of claim 6, wherein determining the at least one depth-related parameter comprises calculating a trigonometrical relationship between the scaled length value and the target length value of the second body member.

8. The method of claim 4, wherein in the predetermined exercise the first body member stays substantially motionless, and the second body member is to be moved such that at least a first anatomical landmark of the second body member moves relative to a second anatomical landmark or such that the second body member rotates relative to the second anatomical landmark.

9. The method of claim 1, further comprising:

capturing one or more additional exercising images; and determining the at least one depth-related parameter associated with the target body member for each of the one or more additional exercising images.

10. The method of claim 1, wherein the at least two calibration length values are calibration length values of a first body member of the person, and the at least two target length values are target length values of the first body member of the person, each target length value corresponding to the distance between the same anatomical landmarks used for determining the distance of each corresponding calibration length value, and wherein the at least one depth-related parameter is determined based on a first target ratio and a second target ratio, the first target ratio being between the at least two calibration length values of the first body member and the second target ratio being between the at least two target length values of the first body member.

11. The method of claim 1, wherein the at least one depth-related parameter indicates the direction as either towards the optical device or away from the optical device.

12. The method of claim 11, wherein the direction is based on at least one biomechanical constraint of the target body member.

13. The method of claim 11, wherein the direction is based on the predetermined exercise.

14. The method of claim 1, wherein the optical device is at a same location and has a same orientation when capturing the calibration image and when capturing the exercising image.

15. The method of claim 1, wherein the motion tracking system comprises a motion tracker arranged on the person, the motion tracker including an inertial measurement unit, and the method further comprising:

processing measurements of the motion tracker taken while the person is in the predetermined calibration position and while the person is in the exercising position, thereby obtaining a set of measurements at different time instants;

detecting that the at least one depth-related parameter and the set of measurements fulfill one or more predetermined constraints associated with the predetermined exercise; and determining, based on the detection, that the predetermined exercise has been correctly executed.

16. The method of claim 1, wherein the motion tracking system comprises a motion tracker arranged on the person, the motion tracker including an inertial measurement unit, and the method further comprising:

processing measurements of the motion tracker taken while the person is in the predetermined calibration position and while the person is in the exercising position, thereby obtaining a set of measurements at different time instants;

detecting that the at least one depth-related parameter and the set of measurements do not fulfill one or more predetermined constraints associated with the predetermined exercise; and determining, based on the detection, that the predetermined exercise has not been correctly executed.

17. The method of claim 1, further comprising:

providing, by the motion tracking system and prior to the capturing of the calibration image, at least one user-perceptible signal indicative of the predetermined calibration position to instruct the person to assume the predetermined calibration position.

18. The method of claim 1, providing, by the motion tracking system and prior to the capturing of the exercising image, at least one user-perceptible signal indicative of the predetermined exercise to instruct the person to perform the predetermined exercise.

19. A motion tracking system comprising at least one computing device and an optical device, the motion tracking system being configured to perform operations comprising:

capturing, by the optical device, a calibration image of a person while the person is in a predetermined calibration position;

processing, by the at least one computing device, the calibration image to determine at least two calibration length values based on distances between anatomical landmarks associated with at least one body member in the calibration image;

capturing, by the optical device, an exercising image of the person while the person is in an exercising position corresponding to a predetermined exercise;

processing, by the at least one computing device, the exercising image to determine at least two target length values based on distances between the anatomical landmarks associated with the at least one body member in the exercising image;

determining, by the at least one computing device and based on the at least two calibration length values and the at least two target length values, at least one depth-related parameter associated with a target body member of the at least one body member, wherein the at least one depth-related parameter comprises a range of motion in depth of a first anatomical landmark of the target body member relative to a second anatomical landmark of the target body member, and wherein the depth is in a direction perpendicular to two other directions corresponding to two dimensions captured by the optical device in the calibration image and the exercising image;

using, by the at least one computing device, the at least one depth-related parameter to track motion of the person with respect to the predetermined exercise; and determining, by the at least one computing device, whether the person has moved the first anatomical landmark relative to the second anatomical landmark according to at least one predetermined range of motion in depth associated with the predetermined exercise.

20. The motion tracking system of claim 19, further comprising a motion tracker being adapted for arrangement on the person, the motion tracker including an inertial measurement unit.

* * * * *